(12) United States Patent
Manepalli et al.

(10) Patent No.: US 12,275,156 B2
(45) Date of Patent: Apr. 15, 2025

(54) MULTIMODAL INTENT RECOGNITION FOR TELEPRESENCE ROBOTS

(71) Applicant: Intel Corporation, Santa Clara, CA (US)

(72) Inventors: Sangeeta Manepalli, Chandler, AZ (US); Siew Wen Chin, Penang (MY)

(73) Assignee: Intel Corporation, Santa Clara, CA (US)

( * ) Notice: Subject to any disclaimer, the term of this patent is extended or adjusted under 35 U.S.C. 154(b) by 782 days.

(21) Appl. No.: 17/356,231

(22) Filed: Jun. 23, 2021

(65) Prior Publication Data

US 2021/0316462 A1 Oct. 14, 2021

(51) Int. Cl.
| | | |
|---|---|---|
| *B25J 9/16* | (2006.01) | |
| *B25J 11/00* | (2006.01) | |
| *B25J 13/00* | (2006.01) | |
| *G06F 3/16* | (2006.01) | |
| *G06V 20/10* | (2022.01) | |
| *G06V 20/52* | (2022.01) | |
| *G06V 40/20* | (2022.01) | |
| *G10L 25/57* | (2013.01) | |
| *H04N 23/661* | (2023.01) | |
| *H04N 23/69* | (2023.01) | |
| *H04N 23/695* | (2023.01) | |

(52) U.S. Cl.
CPC .......... *B25J 9/1689* (2013.01); *B25J 9/1697* (2013.01); *B25J 13/003* (2013.01); *B25J 13/006* (2013.01); *G06F 3/165* (2013.01); *G06V 20/10* (2022.01); *G10L 25/57* (2013.01); *H04N 23/695* (2023.01); *H04N 23/69* (2023.01)

(58) Field of Classification Search
None
See application file for complete search history.

(56) References Cited

U.S. PATENT DOCUMENTS

| | | | |
|---|---|---|---|
| 10,434,653 B2 * | 10/2019 | Yang | ..................... B25J 9/1689 |
| 11,454,981 B1 * | 9/2022 | Ebrahimi Afrouzi | .. G01C 21/20 |
| 2017/0190051 A1 * | 7/2017 | O'Sullivan | .......... G05D 1/0088 |

* cited by examiner

*Primary Examiner* — Thomas E Worden
*Assistant Examiner* — Atticus A Cameron
(74) *Attorney, Agent, or Firm* — Schwegman Lundberg & Woessner, P.A.

(57) ABSTRACT

Disclosed herein are systems and methods for controlling a telepresence robot, sometimes referred to as a receiver. The systems and methods may include obtaining environmental data associated with the receiver and/or an operator of the telepresence robot, sometimes referred to as a sender. A model defining a human intent may be received and an intent of a human proximate the receiver and or the sender may be determined using the model. A first signal may be transmitted to the receiver. The first signal may be operative to cause the receiver to alter a first behavior based on the intent of the human and/or the sender.

23 Claims, 4 Drawing Sheets

MULTIMODAL INTENT RECOGNITION FOR TELEPRESENCE ROBOTS

FIELD OF THE DISCLOSURE

The present subject matter relates to telepresence robots. Specifically, the present disclosure relates to multimodal intent recognition to support seamless navigation and auto visual (AV) experiences for telepresence robots.

BACKGROUND

In today's ever changing work environment, people are working remotely more and more. Working remotely presents new challenges as people are no longer in proximity to one another. The lack of proximity can lead to miscommunication due to an inability to judge the emotions and other social cues of others. A telepresence robot may be robot that is controlled by a user to allow the user to engage others while the user is at a different location. In short, a telepresence robot allows a user to be present at a location while in a way that allows the user to better interact with others as if the user were physically present at the location.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
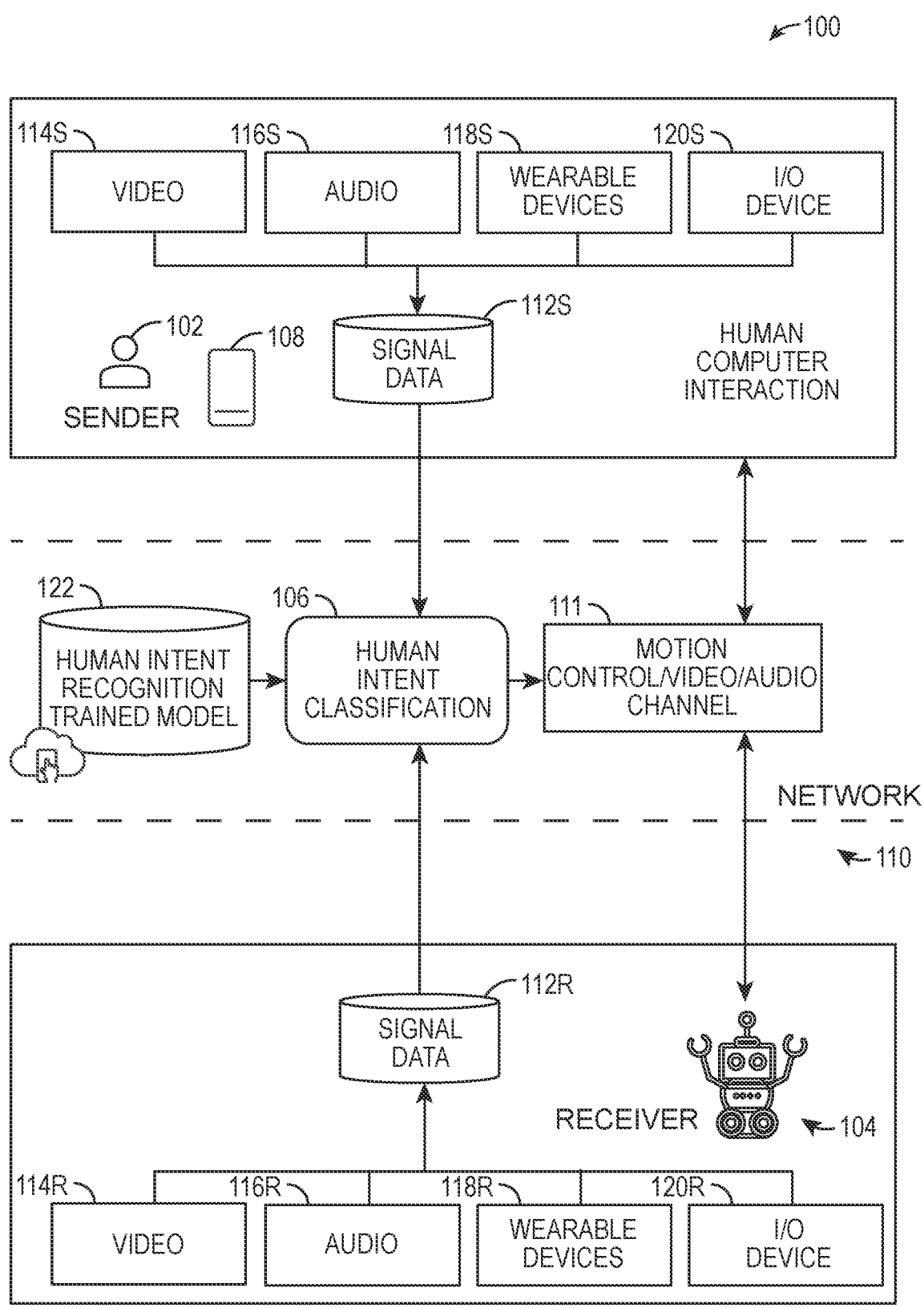
FIG. 1 shows an example system in accordance with at least one example of this disclosure.

Humans are capable of anticipating the intentions of others using non-verbal communication that may incorporate environmental changes. Human-robot collaboration, for example via telepresence robots, in shared autonomy may require reasoning about the intentions of the human partner, sometimes referred to as a sender or collaborator. The autonomy may need to predict and/or infer the intended goal of the human collaborator correctly to provide meaningful assistance. However, most of the human intention understanding for the human-robot collaboration is purely based on the collaborator analytics, sometimes called minimal or basic analysis, for example, visual and/or speech analytics, but lacks correlation with environmental changes surrounding the autonomy. The result may be missing out on a realistic response of the human intent.

With reference to the abovementioned challenges, the systems and methods disclosed herein allow for the consideration of sensor data, semantic information, historical response reaction, etc. to provide shared autonomy (e.g., were a telepresence robot may act autonomously, yet with input from environmental data). The systems and methods disclosed herein provide for the mapping of the remote user's (i.e., the sender) user actions, such as navigation, vision, and speed to environmental data to suggest actions or a possible next set of actions to the sender. The suggested actions may be conducive for the audience located proximate a telepresence robot, sometimes referred to herein as a receiver, to optimize location positioning within a collaboration/meeting room, audio/video (AV) auto adjustments to suit the direct surroundings, etc.

Conventional navigation of telepresence robots often would involve pre-loading a map into a memory of the robot and allowing the sender to select a destination. The robot would then pick the fastest route. While this may optimize run time, the conventional navigation requires the robot to pre-learn, or be preprogrammed with, possible navigation routes via manual training.

As disclosed herein, the systems and methods disclosed herein allow for the use of sensors and other feedback inputs to figure out human density, identify dynamic route changes due to obstacles, such as pathways under repair or otherwise obstructed. Thus, the robots may fine tune its path planning during travel without having to have routes pre-loaded as with conventional navigation of telepresence robots.

The systems and methods disclosed herein allow for multimodal human intention recognition so that actions can be dynamically updated in real-time with respect to positioning of the telepresence robot, pan/zoom of camera, auto-adjust of audio features, etc. Sensory information can be obtained for the surroundings of both the robot and the sender. This sensory data can be processed in between the end-to-end (E2E) data flow (e.g., a remote server) or at the sender end to provide suggestions to operate the robot.

As disclosed herein, multimodal human intention recognition for telepresence robot may provide a better sense of human presence to communicate with the person remotely via the telepresence robot. This can be achieved by analyzing bi-directional human intentions that may correspond to the environmental change. As disclosed herein, intent recognition and/or mapping algorithms may be used for collaboration robots as well.

The above discussion is intended to provide an overview of subject matter of the present patent application. It is not intended to provide an exclusive or exhaustive explanation. The description below is included to provide further information.

Turning now to the figures, FIG. 1 shows a system 100 for a multimodal human intention recognition in accordance with at least one example of this disclosure. As shown in FIG. 1, system 100 may include a human collaborator, referred to as sender 102 and a remotely autonomous device, referred to as receiver 104. Examples of receiver 104 include, but are not limited to, a telepresence robot or other autonomous machinery. As disclosed herein, both sender 102 and receiver 104 may be capable of multimodal data sensing using a variety of sensors and other data collection devices.

Sender 102 and receiver 104 may communicate via a human intent classification component 106 via a network. Human intent classification component 106 may be a bi-directional component that allows data to flow both to and from sender 102 and receiver 104. Using human intent classification component 106, human intent classification and mapping may occur. For example, as disclosed herein, human intent classification may be used to support receiver 104 to provide a greater sense of human presence to an audience of receiver 104 as well as sender 102.

An example scenario may include a meeting and/or collaboration event. Other example scenarios may include, but are not limited to, retail, hospitality, etc. Using the meeting scenario, sender 102 may navigate receiver 104 through an environment, such as an office, via a computing device 108. Non-limiting examples of computer device 108 may include a computer, smartphone, tablet, etc. Sender 102 can remotely control navigation of receiver 104 so as to guide receiver 104 to a conference room, individual office, or other collaboration space.

As disclosed herein, as receiver 104 traverse a space, receiver 104 may reposition itself within the collaboration area with changes in video, audio, movement of other participants, etc. to support interaction on both receiver and sender ends.

Human intent classification component 106 may be a component of a network 110, which may be a network layer, a network edge, or compute at the network layer.

Network 110 in conjunction with human intent classification component 106 may provide additional capabilities that might not otherwise be available to sender 102 and/or receiver 104. For example, network 110 may have greater compute resources than receiver 104 and computing device 108. Stated another way, network 110, which is located in between domains of sender 102 and receiver 104 to provide bi-directional flow of data, to expedite communications between both sender 102 and receiver 104.

Human intent classification component 106 may utilize a motion channel 111 to provide bi-directional communication between sender 102 and receiver 104. Human intent classification component 106 may also receive inputs from databases 112 (labeled individually as databases 112R and 112S). Databases 112 may provide image data collected by video devices 114 (labeled individually as video devices 114R and 114S), audio signals collected by audio devices 116 (labeled individually as audio devices 116R and 116S), wearable devices 118 (labeled individually as wearable devices 118R and 118S). and other input/output (I/O) devices 120 (labeled individually as I/O devices 120R and 120S). Video devices, 114 and audio devices 116 may also broadcast video and audio data as well as collect data. For example, audio devices 116 may include both speakers and microphones to both collect and broadcast sound data. Examples of other I/O devices 120 include, but are not limited to radio frequency transmitters, receivers, and/or transceivers, laser devices, such as light detection and ranging (LIDAR) devices, and/or acoustic devices that can be used to map spaces in 3-dimensions. Using the various I/O devices 120, three-dimensional projections of a space or area can be created and translated into a two-dimensional plane that receiver 104 can then navigate. The two-dimensional mapping may also be shared with sender 102 to allow for remote control of receiver 104 instead of, or as an augment for, autonomous control.

As disclosed herein, video source 114S, audio source 116S, wearable device 118S, and I/O device 120S may collect environmental data associated with sender 102. The various components of the data may be used to determine an intent of sender 102. For example, background noise proximate sender 102 may be detected and a volume associated with audio speakers of audio device 116S may be increased. In addition, audio device 116S may transmit data about background noise to human intent classification component 106, which may use the data to filter the background noise or otherwise transmit a noise canceling signal to audio device 116S to aid sender 102 in hearing audio received from receiver 104. The same may also occur with receiver 104 sending audio information to human intent classification component 106 to reduce background noise or otherwise improve audio quality.

As another example, audio device 116R may capture an audience member speak a keyword (e.g., "loud,", "louder", etc.) or other phase indicating a difficulty in hearing for sender 102. The data can be transferred to human intent classification component 106, which may be a component of a network edge, for processing to support faster and improved collaboration, as well as to reduce lag and/or latency effects. Should video device 114S capture images of audience members constantly shielding their ears, human intent classification component 106 may transmit a signal to audio device 116R to lower the volume. In another example, if receiver 104 detects a gesture/gaze/behavior from audience members, a sensitivity setting of audio device 116R may be reduced because the gestures/behaviors imply the intent of the audience members is to have a more private discussion.

As another example, whenever the intent of sender 102 to view a whiteboard is detected (e.g., sender's gaze/gesture tracking), video pan/zoom requests may be made on behalf of sender 102. Using other data collected by receiver 104, a determination of the distance between receiver 104 and the whiteboard may be factored in with zoom capabilities of video device 114R to determine if receiver 104 needs to reposition itself for better optical performance. Stated another way, when human intent classification component 106 determines that sender 102 wants a better view of a whiteboard, or any object, receiver 104 may autonomously reposition itself to provide better visibility without optical distortion. Optical character recognition (OCR) software and/or image resolution statistics (e.g., number of characters per pixel/total resolution) may also be used to identify such scenarios.

For autonomous operations, sender 102 may instruct receiver 104 to travel to and from meeting locations, offices, elevators, etc. without input from sender 102. Stated another way, the network can help preselect navigation destination or let the receiver 104 decide on a best route. Using the environmental data collected, receiver 104 may dynamically adjust the route based on interactions with humans or other objects along the route. For example, receiver 104 may collect images of nearby humans focused on mobile devices. The humans may not notice receiver 104. To avoid a collision, receiver 104 may receive instructions from human intent classification component 106 to change course.

As disclosed herein, video (sometimes referred to as vision), audio, RF, and/or other sensors that can be used to collect data used to analyze human intentions. The various data collected overtime can be used to generate and train models for human intent recognition. The data and models can be saved in a database 122 and accessed by human intent classification component 106. The various data can be collected from both the human collaborator (i.e., sender 102) as well as the people located proximate a telepresence robot (i.e., receiver 104).

During navigation or other functions, the sensor information may be collected. Using the data, the models can be generated and trained. In addition, during navigation, the data may be used in conjunction with the trained models to recommend different positioning options to sender 102 by mapping three-dimensional routes onto a two-dimensional video feed sent to sender 102. The posture and communication manner of receiver 104 can also be adaptively adjusted according to both the recognized human intention from sender 102 and receiver 104 through the collected sensor information.

Figure 2:
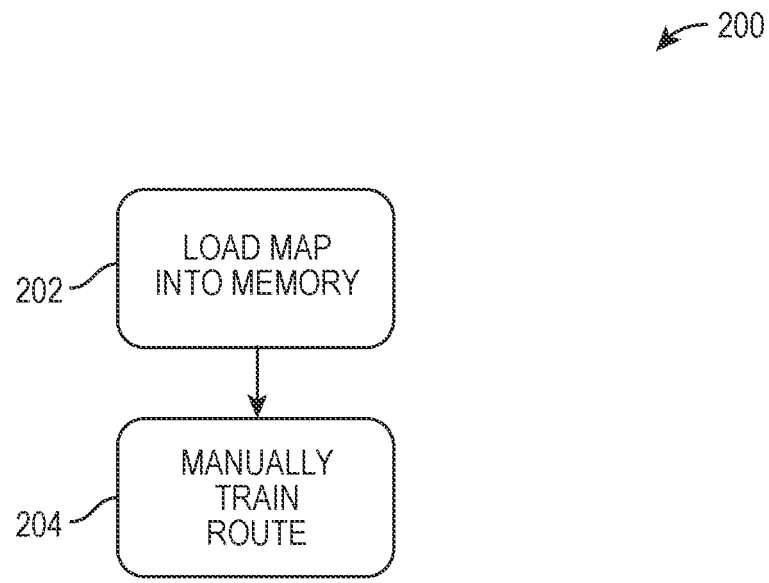
FIG. 2 shows an example method in accordance with at least one example of this disclosure.

Turning now to FIG. 2, FIG. 2 illustrates a method 200 in accordance with at least one example of this disclosure. Method 200 may begin at stage 202 where a map may be loaded into a memory of a receiver, such as receiver 104. The map may include a two-dimensional representation of a floorplan of an office space in which the receiver operates.

Once the map is loaded into the memory, manual training of the route can be performed using "follow me" guidance (204). In other words, once the maps are loaded into the receiver, the receiver may then follow a person to further train the receiver. This training can help the receiver to identify route dynamics, human density patterns, etc. so that the receiver can fine tune routes about the spaces identified in the loaded maps.

Figure 3:
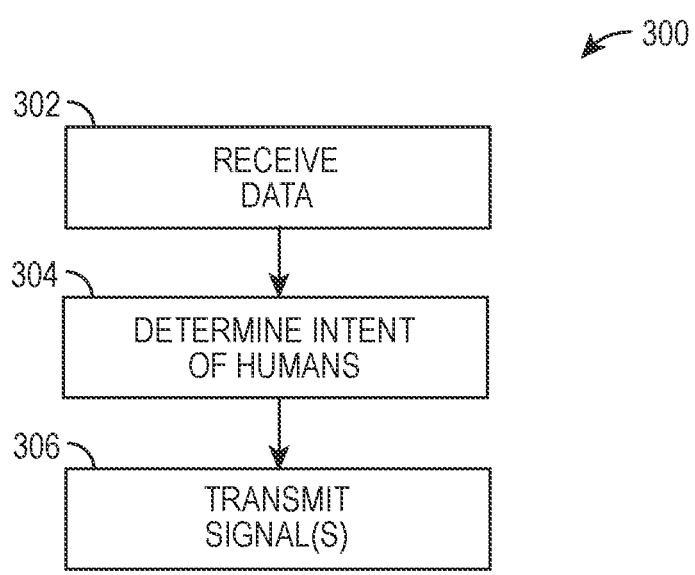
FIG. 3 shows an example method in accordance with at least one example of this disclosure.

Turning now to FIG. 3, FIG. 3 illustrates a method 300 in accordance with at least one example of this disclosure. Method 300 may begin at stage 302 where data may be received by a computing device, such as a computer system 500 disclosed in FIG. 5, which may implement human intent classification component 106 and motion channel 111. For example, data may be received from multiple sources as disclosed herein. For instance, sensors, such as disclosed with respect to FIG. 1, may collect environmental data associated with both a sender, such as sender 102, and a receiver, such as receiver 104. The environmental data can be transmitted via a network, such as network 110 or network 526 disclosed below with respect to FIG. 5.

The received or collected data can include biometric data. For example, the sender may be wearing a wearable, such as a smart watch, that can record biometric data. Non-limiting examples of biometric data may include heartrate, perspiration, blood-oxygen levels, etc. Other devices, such as cameras or audio devices, may capture eye movement, pupil dilation, arm movements, and noises produced by the sender. Background noise, temperature, and other environmental conditions may also be captured and transmitted to the computing device.

Environmental data associated with the receiver may also be captured and transmitted to the computing device. For example, the receiver may be equipped with sensors to capture movement of humans or other telepresence robots located proximate the receiver. The receiver may also capture biometric data of humans proximate its location by capturing data shared by participants via wearables or other devices.

Once the various data is received, the computing device may determine an intent of one or more humans (304). For example, as part of receiving the data, the computing device may have received one or more models from the sender, the receiver, or a remote computing device. The computing device may have retrieved the model from a database or other data structure stored on a local storage media. Using the data as inputs for the model, the computing device may determine an intent of the sender and/or humans located proximate the receiver.

The various models disclosed herein may include one or more statistical models. For example, based on a particular data point or collection of data points, a given intent may inferred or otherwise predicted for give percentage of instances. For example, lack of motion by a person located proximate the receiver may be inferred as an intent not to move out of a path of the receiver 75% of the time. The various models may also have confidence intervals associated with them. Thus, when determining an intent of a person, the confidence interval can be used as a criterial for ranking the intents when more than one intent may be inferred. For example, if the data indicates the person's intent may be "intent A" with a confidence interval of 80% and "intent B" with a 60% confidence interval, intent A may be selected as the determined intent due to the higher confidence interval.

The models may allow for a more "sense of human presence" interaction between the sender and humans located proximate the receiver. For example, while the sender may be in a different location, such as different, city, state, or country, the various data can be used in conjunction with the models so that the receiver behaves more like the sender and/or adapts to the environment to allow the sender to better engage with the people located near the receiver.

The intent of the sender may be to look at a whiteboard being used during a presentation. This intent can be determined using images of the sender and tracking eye movement to determine the sender is looking at the whiteboard located on a display screen of his or be r local computing device. Other intended behaviors can include people located proximate the sender wishing to have a more private conversation. This intent can be determined by analyzing sound levels to determine the people are whispering. Other data that can support the inference may include the people leaning toward one another. Thus, multiple data points may be used in conjunction with one or more models to determine intent.

Once an intent is determined, the computing device may transmit one or more signals to the sender and/or receiver (306). The signals may be operative to alter a behavior of a computer used by the sender and/or the receiver. For example, a signal transmitted to the sender may cause a video device associated with the sender to zoom in or out on a particular item being displayed. A signal transmitted to the receiver may cause the receiver to reposition itself autonomously as disclosed herein.

As disclosed herein, audio data may be received in stage 302. The intent determined to correspond with the data may be that the sender wants to listen more closely or is having trouble hearing due to background noise. Thus, the transmitted signals may cause an audio change at the sender and/or the receiver. For example, the signal may automatically increase or decrease the volume setting for a speaker located proximate the sender and/or the people around the receiver based on background noise.

Audio data may include keywords. For example, detection of certain words such as "louder" or "loud." Upon hearing a keyword alone, or in conjunction with other data, the speaker volume may be automatically adjusted without intervention from the sender.

The audio data may also be used in other ways as well. For example, using visual data, it may be determined that the sender is listening, but not taking notes. Thus, the computing device may prepare a transcription of the conversation, or portions of the conversation, and transmit the transcription to the sender. The transcription can be supplemented using optical character recognition (OCR) techniques and visual data collected, for instance, from a whiteboard, as disclosed herein.

Audio changes based on a determined intent at the sender end can include data collected by wearable device combined by data received by the receiver to adjust microphone characteristics. For example, to improve audio quality and/or modify the speaker for receiving the speech from remote end, microphone settings on the receiver may be adjusted. Speaker settings (e.g., treble, base, surround sound settings, etc.) for the senders' audio devices may also be adjusted to improve audio quality. Additional enhancements like speaker separation performed by receiver may also support sharing different speaker streams or speech to text transformations for an improved collaboration experience.

Video changes may also be implemented in response to the determined intent. For example, auto or recommended pan/zoom settings may be a feature on the sender. In instances where visual aids, such as whiteboards, physical models, or other displays, are being used for collaboration, the receiver may adjust pan/zoom settings to allow the sender better visuals.

OCR software implemented by the computing device running at the network edge or on the robot could try to pre-process and analyze characters on the whiteboard. If the results are less than a certain accuracy threshold an auto pan/zoom feature may be implemented based on multiple levels (e.g., result <30%, zoom=30%; result zoom=50%, etc.). Additionally, the focus point of the whiteboard may be adjusted based on the intention detected via gesture/gaze from both the sender's and receiver's side. For example, using object tracking and captured images of the sender, it may be determined that the sender intends to focus on a particular portion of the whiteboard. Using this information, the receiver may adjust cameras to focus on the particular portion of the whiteboard of interest to the sender.

Auto image collection when using a whiteboard may also be performed. For example, audio keywords or actions performed by a person proximate the receiver may trigger a screen capture of the whiteboard. The screen capture may include saving various frames of a video feed. Using various frames from the video feed, the computing device may determine when a slide is changed or a whiteboard is erased. For example, the computing device may use image subtraction or other image comparison methods to determine when a majority of the pixels associated with image frames of the whiteboard change. Upon determining the change, the computing device may save a frame of the video stream prior to the frame where the change was detected.

The receiver may also stream video or still images to a screen based on content shared by the sender. For example, the receiver may connect to a multimedia device or electronic whiteboard via a wireless connection, (e.g., Bluetooth) and transmits media based on an intent of the sender. For example, the sender may utilize a whiteboard app to stream video. The computing device may determine the sender intends to focus on a particular portion of the video by determining the sender's eyes are focused on a particular portion (e.g., a particular graphic or widget) of the video.

Using the audio and video data, the receiver can be adjusted in case any sensitive information may be being shared and needs to be stopped or removed due to a disturbance or change identified at remote end. For example, based on the audio data, the computing device may determine there is a knock on a door proximate the sender, who may be working at home, and the change may be to halt displaying proprietary information in a presentation the sender is sharing. Other changes may include a new person entering the meeting room, which may warrant temporarily halting a display, etc.

Using biometric data, either alone or in conjunction with audio/visual data, emotion changes of people surrounding the receiver may be determined. For example, using non-invasive emotion sensing mechanism such as wearable devices, heartbeat, respiration, etc. may be detected along with gestures using accelerometers and other audio/visual behaviors. This emotional change can be translated into an engagement level of the collaborators and help the sender react accordingly. For example, based on the response by a sender's audience, movement pace, audio tone, gesture of the sender may be adjusted according to the emotion change at the sender/receiver end.

Figure 4:
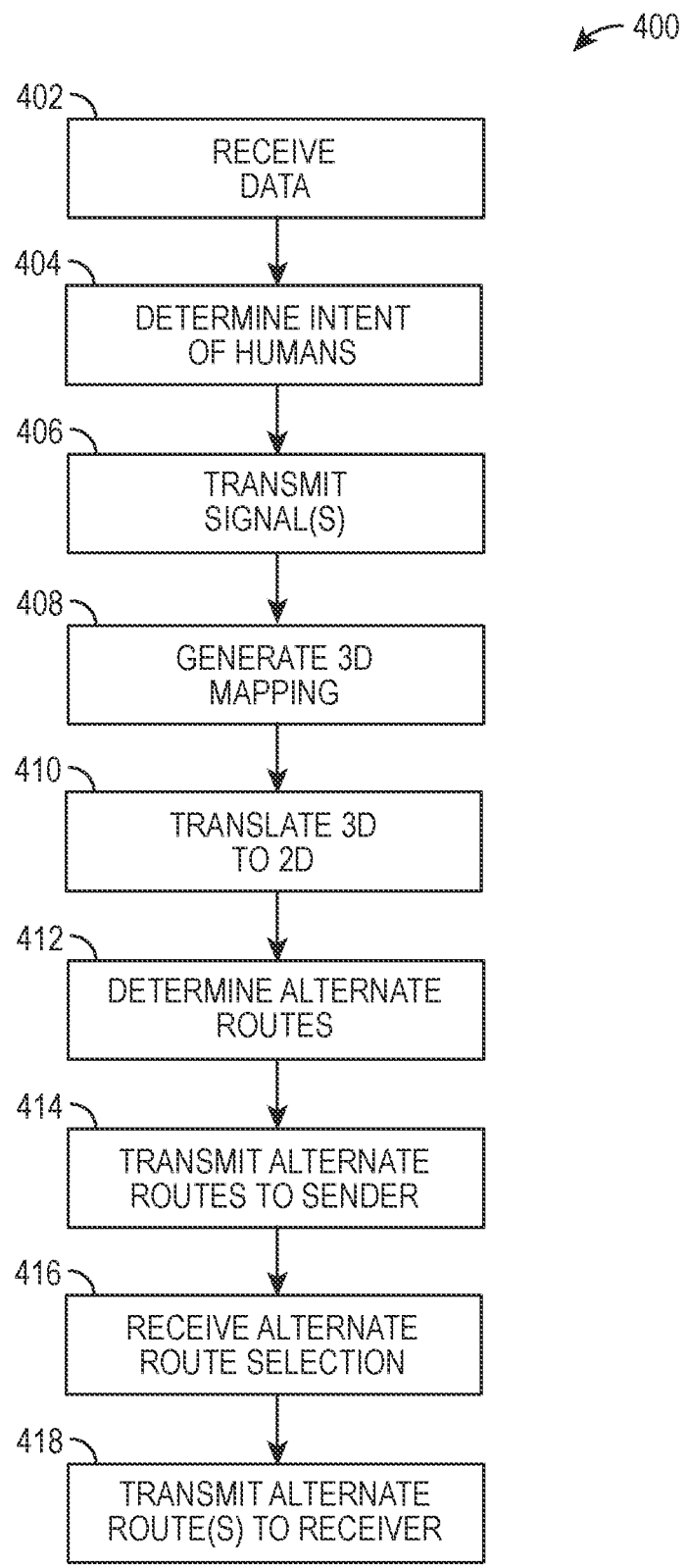
FIG. 4 shows an example method in accordance with at least one example of this disclosure.

Turning now to FIG. 4, FIG. 4 illustrates a method 400 for repositioning a receiver in accordance with at least one example of this disclosure. Method 400 may begin at stage 202 where data may be received by a computing device, such as a computer system 600 disclosed in FIG. 6, which may implement human intent classification component 106 and motion channel 111. For example, data may be received from multiple sources as disclosed herein. For instance, sensors, such as disclosed with respect to FIG. 1, may collect environmental data associated with both a sender, such as sender 102, and a receiver, such as receiver 104. The environmental data can be transmitted via a network, such as network 110 or network 626 disclosed below with respect to FIG. 6.

The received or collected data can include biometric data. For example, the sender may be wearing a wearable, such as a smart watch, that can record biometric data. Non-limiting examples of biometric data may include heartrate, perspiration, blood-oxygen levels, etc. Other devices, such as cameras or audio devices, may capture eye movement, pupil dilation, arm movements, and noises produced by the sender. Background noise, temperature, and other environmental conditions may also be captured and transmitted to the computing device.

Environmental data associated with the receiver may also be captured and transmitted to the computing device. For example, the receiver may be equipped with sensors to capture movement of humans or other telepresence robots located proximate the receiver. The receiver may also capture biometric data of humans proximate its location by capturing data shared by participants via wearables or other devices.

Once the various data is received, the computing device may determine an intent of one or more humans (404). For example, as part of receiving the data, the computing device may have received one or more models from the sender, the receiver, or a remote computing device. The computing device may have retrieved the model from a database or other data structure stored on a local storage media. Using the data as inputs for the model, the computing device may determine an intent of the sender and/or humans located proximate the receiver.

The various models disclosed herein may include one or more statistical models. For example, based on a particular data point or collection of data points, a given intent may be inferred or otherwise predicted for give percentage of instances. For example, lack of motion by a person located proximate the receiver may be inferred as an intent not to move out of a path of the receiver 75% of the time. The various models may also have confidence intervals associated with them. Thus, when determining an intent of a person, the confidence interval can be used as a criterial for ranking the intents when more than one intent may be inferred. For example, if the data indicates the person's intent may be "intent A" with a confidence interval of 80% and "intent B" with a 60% confidence interval, intent A may be selected as the determined intent due to the higher confidence interval.

The models may allow for a more "sense of human presence" interaction between the sender and humans located proximate the receiver. For example, while the sender may be in a different location, such as different, city, state, or country, the various data can be used in conjunction with the models so that the receiver behaves more like the sender and/or adapts to the environment to allow the sender to better engage with the people located near the receiver.

Once an intent is determined, the computing device may transmit one or more signals to the sender and/or receiver (406). The signals may be operative to alter a behavior of a computer used by the sender and/or the receiver. For example, a signal transmitted to the sender may cause a video device associated with the sender to zoom in or out on a particular item being displayed. A signal transmitted to the receiver may cause the receiver to reposition itself autonomously as disclosed herein.

To reposition in an autonomous manner, the receiver may receive data in stage 402 that is related to the physical environment in addition to the human data described herein. For example, the environmental data received may include spatial data. The spatial data may be collected using optical and acoustic sensors. For example, laser, sonar. LIDAR, and other spatial systems may be used to collect spatial data. The spatial data may be used to identify physical objects that may be located along a travel path of the receiver. Other physical objects may include dense crowds of people. Other sensors such as radio frequency, infrared, humidity, etc. may be used to augment the spatial data.

Using the spatial data, a three-dimensional mapping of a space may be generated (408). The three-dimensional mapping may be a three-dimensional (3D) point cloud. An example of a mapping protocol includes OpenGL orthogonal mapping. The position of the receiver within the 3D point cloud may be determined. For example, the spatial data may include time values for sound, light, etc. transmitted in various directions to be reflected back to the receiver. Using time of flight calculations in conjunction with the time values, the location of physical objects can be determined with respect to the receiver's location. Using the various locations of physical objects, a three-dimensional mapping can be created. The mapping may include various ordered triplets that may define boundaries of objects located proximate the receiver. Stated another way, ordered triplets may be used to define a location of physical objects within a surrounding area of the receiver.

The physical objects may be stationary or mobile. For example, stationary objects such as furniture, walls, stairs, etc. may be located within a space occupied by the receiver and mapped as disclosed herein. Mobile objects may include people, other telepresence robots, or movable furniture, such as chairs and/or carts. Thus, the receiver may continuously collect spatial data and transmit the data to the computing device to generate three-dimensional mappings as disclosed herein.

The computing device may also translate the three-dimensional mapping to a two-dimensional mapping (410). To translate the three-dimensional mapping to a two-dimensional mapping, projections may be performed. For example, a large flat surface may be determined to be a floor and used as a reference datum. Thus, the z value of the ordered triplets can be set to zero or otherwise used as the reference datum.

Other items located above the reference datum can be projected onto the reference datum or any arbitrary location above the reference datum. The projection of objects may be used to create a boundary in which the receiver should stay to avoid hitting objects. Thus, a cabinet or other fixture that is located above the floor may be projected to create the two-dimensional mapping. Items located a certain distance above the reference datum may not be projected. For example, a light fixture suspended from the ceiling may not extend down far enough that the receiver would hit the fixture as it traveled underneath it. Thus, the light fixture may not be projected into the two-dimensional mapping since the receiver would not hit it while traveling under it.

The two-dimensional mapping may be a collection of ordered pairs. The mapping may include iterating through the ordered triplets comprising the three-dimensional mapping to select ordered triplets that define a boundary in a two-dimensional plane in which the receiver can travel. For example, if all of the ordered triplets that represent the floor have a value of (X, Y, 0), then any triplet with a Z value greater than 0 and less than H (e.g., the height of the receiver) can be used to define the boundary.

An example of the three-dimensional mapping may produce a list of ordered triplets. The translation to two-dimensions may include selecting a random ordered triplet, or an ordered triplet one unit from the receiver (the receiver being the origin) with a Z value of 0 and then stepping one unit in each of the X and Y directions until a value oft greater than 0 or less than H is found. The result may be one or more routes the receiver may traverse without hitting anything.

Using either the three-dimensional mapping or the two-dimensional mapping, two or more alternate routes may be determined (412). The navigation systems of the receiver may allow the receiver to autonomously reposition itself. Thus, computing device may determine the alternate routes using the mapping. To support the receiver repositioning, a navigation algorithm may determine the alternate routes. Selecting alternate routes may include ensuring there are no errors in mapping to 2D space and ensuring that destination points are within a near plane of 2D projections for the best usage experience by the sender. The alternate routes may be transmitted to the sender (414).

The sender may select at least one of the alternate routes and send the selection to the computing device (416). Part of the selection process may include viewing a visualization of the alternate routes. For example, using the three-dimensional data and other images captures by the receiver, a rendering may be generated for each of the routes. Based upon the renderings, the sender may select one of the alternate routes. Selecting the alternate routes may also include listing a subset of the alternate routes by preferred route. For example, if five alternate routes are generated and supplied to the sender, the sender may rank three of the routes in order of preference.

The selected alternate route or listing of preferred routes may be transmitted by the computing device to the receiver (418) so as to redirect the receiver within the space based on the two-dimensional mapping of the space. The receiver may then traverse the selected route or select one of the listed routes to traverse. For example, if single alternate route is selected by the sender, then the receiver may traverse the selected routes. If multiple alternate routes are selected and ranked by the sender, the receiver may evaluate each using updated data received and travel the most optimal route. For instance, in the time between when the sender selected the routes, an obstacle may be located along the route favored by the sender. If the obstacle would interfere with the receiver, the receiver may select an alternate route from the routes selected by the sender.

An example of an obstacle that may interfere with the receiver traveling a selected route may include a large number of people suddenly entering and/or are walking in a corridor could lead the receiver to look for other alternative routes. As the receiver traverse the route, data may be collected and transmitted as disclosed herein to allow for routes to be updated. For example, based on the data collected while the receiver traverse the route, an intent of the people may be to not move. Thus, the receiver may slow its movement. If the receiver is operating in an autonomous mode, the network workload can act as an intermediary updating the destination point and/or indicating a slower movement to let the sender know of any changes.

While methods 200, 300, and 400 have been described in a particular order and with various stages, methods 200, 300, and 400 may be implemented with the various stages arranged in differing orders and/or with one or more of the stages omitted. In addition, various stages from each of methods 200, 300, and 400 may be in conjunction with or as a replacement for a stage from a different method. For example, the various route determinations stages may be omitted when the receiver is in a conference room. In this instance, the computing device may forgo generating routes and instead devote compute resources to determining the intent of the sender and people located proximate the receiver in order to adjust audio volumes, zoom/pan settings, etc. as disclosed herein to provide the sender and others a more natural interaction with one another. In another example, stage 202 of loading maps into a memory may be added to method 400 to assist with generating either the three-dimensional mapping in stage 408 and/or translating the three-dimensional mapping to a two-dimensional mapping in stage 410.

To summarize, an automated response by receiver or suggestions from receiver to sender may be based on contextual data supports an operating model that can reduce fatigue for the sender, provide a more natural interaction on the receiver end and enable a wide scale usage of the telepresence robots in the hybrid environment.

The various embodiments disclosed herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the -readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules or similar components or mechanisms may be hardware, software, or firmware communicatively coupled to one or more processors in order to carry out the operations described herein. Modules or similar components or mechanisms may be hardware entities, and may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module, component, or mechanism that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 5:
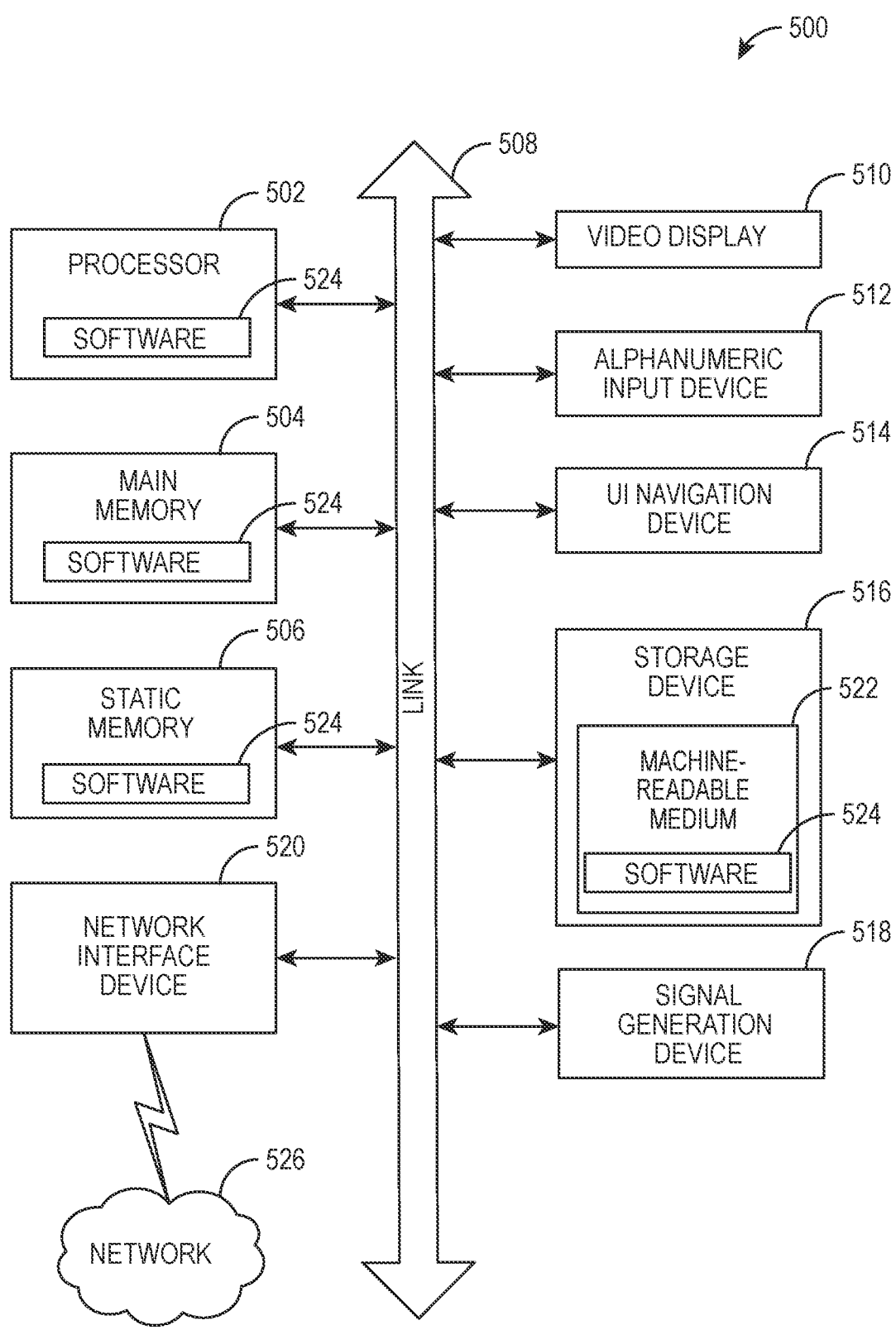
FIG. 5 shows a block diagram illustrating an example machine upon which any one or more of the techniques (e.g., methodologies) discussed herein may perform in accordance with at least one example of this disclosure.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 5 is a block diagram illustrating a machine in the example form of a computer system 500, such as human intent classification component 106, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, gyrometer, magnetometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or Satellite (e.g., low-earth orbit) networks). The term "transmission medium" shall be taken to include any intangible medium that is capable of storing, encoding, or carrying instructions for execution by the machine, and includes digital or analog communications signals or other intangible medium to facilitate communication of such software.

Additional Notes

The following, non-limiting examples, detail certain aspects of the present subject matter to solve the challenges and provide the benefits discussed herein, among others.

Example 1 is a system for controlling a receiver, the system comprising: at least one processor; and at least one memory storing instructions that, when executed by the processor, cause the processor to perform operations that: obtain, from the receiver, environmental data associated with the receiver, receive, from a database, a model defining a human intent, determine an intent of a human proximate the receiver using the model, and transmit a first signal to the receiver, the first signal operative to cause the receiver to alter a first behavior based on the intent of the human.

In Example 2, the subject matter of Example 1 optionally includes wherein the operations further: obtain, from a sender, environmental data associated with the sender; determine an intent of the sender based on a model associated with the sender; and transmit a second signal to the receiver, the second signal operative to cause the receiver to alter a second behavior based on the intent of the sender.

In Example 3, the subject matter of any one or more of Examples 1-2 optionally include wherein obtain the environmental data includes obtain audio data via one or more audio devices attached to the receiver, and the first signal operative to alter the first behavior includes the first signal operative to adjust a volume associate with at least one of the one or more audio devices attached to the receiver.

In Example 4, the subject matter of any one or more of Examples 1-3 optionally include wherein obtain the environmental data includes obtain visual data via one or more video device attached to the receiver, and the first signal operative to alter the first behavior includes the first signal operative to adjust a position of the receiver based on the intent of the human.

In Example 5, the subject matter of any one or more of Examples 1-4 optionally include wherein obtain the environmental data includes obtain spatial data via at least one of an optical sensor and an acoustic sensor.

In Example 6, the subject matter of Example 5 optionally includes wherein the operations further: generate a three-dimensional mapping of a space based on the spatial data; and translate the three-dimensional mapping of the space to a two-dimensional mapping of the space; wherein the first signal is further operative to redirect the receiver within the space based on the two-dimensional mapping of the space.

In Example 7, the subject matter of any one or more of Examples 5-6 optionally include wherein the operations further: generate two or more alternate routings based on a two-dimensional mapping of a space associated with the spatial data; transmit the two or more alternate routings to a sender; and receive a selection of one of the two or more alternate routings from the sender, wherein the first signal operative to redirect the receiver includes the first signal operative to redirect the receiver along the one of the two or more alternate routings received from the sender.

In Example 8, the subject matter of any one or more of Examples 1-7 optionally include wherein obtain the model includes obtain a trained model.

In Example 9, the subject matter of any one or more of Examples 1-8 optionally include wherein the model includes a statistical model and determining the intent of the human include determining the intent of the human based on the statistical model.

Example 10 is a method for controlling a receiver, the method comprising: obtaining, at a computing device from the receiver, environmental data associated with the receiver; obtaining, from a database, a model defining a human intent; determining, by the computing device, an intent of a human proximate the receiver using the model; and causing the computing device to transmit a first signal to the receiver, the first signal operative to cause the receiver to alter a first behavior based on the intent of the human.

In Example 11, the subject matter of Example 10 optionally includes obtaining, at the computing device from a sender, environmental data associated with the sender; determining, by the computing device, an intent of the sender based on a model associated with the sender; and causing the computing device to transmit a second signal to the receiver, the second signal operative to cause the receiver to alter a second behavior based on the intent of the sender.

In Example 12, the subject matter of any one or more of Examples 10-11 optionally include wherein obtaining the environmental data includes obtaining audio data via one or more audio devices attached to the receiver, and the first signal operative to alter the first behavior includes the first signal operative to adjust a volume associate with at least one of the one or more audio devices attached to the receiver.

In Example 13, the subject matter of any one or more of Examples 10-12 optionally include wherein obtaining the environmental data includes obtaining visual data via one or more video device attached to the receiver, and the first signal operative to alter the first behavior includes the first signal operative to adjust a position of the receiver based on the intent of the human.

In Example 14, the subject matter of any one or more of Examples 10-13 optionally include wherein obtaining the environmental data includes obtaining spatial data via at least one of an optical sensor and an acoustic sensor.

In Example 15, the subject matter of Example 14 optionally includes generating a three-dimensional mapping of a space based on the spatial data; and translating the three-dimensional mapping of the space to a two-dimensional mapping of the space; wherein the first signal is further operative to redirect the receiver within the space based on the two-dimensional mapping of the space.

In Example 16, the subject matter of any one or more of Examples 14-15 optionally include generating two or more alternate routings based on a two-dimensional mapping of a space associated with the spatial data; causing the computing device to transmit the two or more alternate routings to a sender; and obtaining a selection of one of the two or more alternate routings from the sender, wherein the first signal operative to redirect the receiver includes the first signal operative to redirect the receiver along the one of the two or more alternate routings received from the sender.

In Example 17, the subject matter of any one or more of Examples 10-16 optionally include wherein obtaining the model includes obtaining a trained model.

In Example 18, the subject matter of any one or more of Examples 10-17 optionally include wherein the model includes a statistical model and determining the intent of the human include determining the intent of the human based on the statistical model.

Example 19 is at least one computer-readable medium comprising instructions to perform any of the methods of Examples 10-18.

Example 20 is an apparatus comprising means for performing any of the methods of Examples 10-18.

Example 21 is at least one non-transitory computer-readable medium storing instructions that, when executed by at least one processor, cause the at least one processor to perform operations that: obtain, from a receiver, environmental data associated with the receiver; obtain, from a database, a model defining a human intent; determine, by the computing device, an intent of a human proximate the receiver using the model; and transmit, by the computing device, a first signal to the receiver, the first signal operative to cause the receiver to alter a first behavior based on the intent of the human.

In Example 22, the subject matter of Example 21 optionally includes wherein the operations further: obtain, at the computing device from a sender, environmental data associated with the sender; determine, by the computing device, an intent of the sender based on a model associated with the sender; and transmit a second signal to the receiver, the second signal operative to cause the receiver to alter a second behavior based on the intent of the sender.

In Example 23, the subject matter of any one or more of Examples 21-22 optionally include wherein obtain the environmental data includes obtain audio data via one or more audio devices attached to the receiver, and the first signal operative to alter the first behavior includes the first signal operative to adjust a volume associate with at least one of the one or more audio devices attached to the receiver.

In Example 24, the subject matter of any one or more of Examples 21-23 optionally include wherein obtain the environmental data includes obtain visual data via one or more video device attached to the receiver, and the first signal operative to alter the first behavior includes the first signal operative to adjust a position of the receiver based on the intent of the human.

In Example 25, the subject matter of any one or more of Examples 21-24 optionally include wherein obtain the environmental data included obtain spatial data via at least one of an optical sensor and an acoustic sensor.

In Example 26, the subject matter of Example 25 optionally includes wherein the operations further: generate a three-dimensional mapping of a space based on the spatial data; and translate the three-dimensional mapping of the space to a two-dimensional mapping of the space; wherein the first signal is further operative to redirect the receiver within the space based on the two-dimensional mapping of the space.

In Example 27, the subject matter of any one or more of Examples 25-26 optionally include wherein the operations further: generate two or more alternate routings based on a two-dimensional mapping of a space associated with the spatial data; transmit the two or more alternate routings to a sender; and obtain a selection of one of the two or more alternate routings from the sender, wherein the first signal operative to redirect the receiver includes the first signal operative to redirect the receiver along the one of the two or more alternate routings received from the sender.

In Example 28, the subject matter of any one or more of Examples 21-27 optionally include wherein obtain the model includes obtain a trained model.

In Example 29, the subject matter of any one or more of Examples 21-28 optionally include wherein the model includes a statistical model and determining the intent of the human include determining the intent of the human based on the statistical model.

Example 30 is a system for controlling a receiver by a sender, the system comprising: at least one processor; and at least one memory storing instructions that, when executed by the processor, cause the processor to perform operations that: obtain, from the sender, environmental data associated with the receiver; obtain, from a database, a first model defining a human intent; determine an intent of the sender using the first model; and transmit a first signal to the receiver, the first signal operative to cause the receiver to alter a first behavior based on the intent of the sender.

In Example 31, the subject matter of Example 30 optionally includes wherein the operations further: obtain, from the receiver, environmental data associated with the receiver; determine an intent of a human located proximate the receiver based on a second model; and transmit a second signal to the receiver, the second signal operative to cause the receiver to alter a second behavior based on the intent of the human.

In Example 32, the subject matter of any one or more of Examples 30-31 optionally include wherein obtain the environmental data includes obtain audio data via one or more audio devices associated with the sender, and the first signal operative to alter the first behavior includes the first signal operative to adjust a volume associate with at least one of the one or more audio devices associated with the sender.

In Example 33, the subject matter of any one or more of Examples 30-32 optionally include wherein obtain the environmental data includes obtain visual data via one or more video device associated with the sender, and the first signal operative to alter the first behavior includes the first signal operative to adjust a position of the receiver based on the intent of the sender.

In Example 34, the subject matter of any one or more of Examples 30-33 optionally include wherein obtain the environmental data includes obtain spatial data via at least one of an optical sensor and an acoustic sensor.

In Example 35, the subject matter of Example 34 optionally includes wherein the operations further: generate a three-dimensional mapping of a space based on the spatial data; and translate the three-dimensional mapping of the space to a two-dimensional mapping of the space; wherein the first signal is further operative to redirect the receiver within the space based on the two-dimensional mapping of the space and the intent of the sender.

In Example 36, the subject matter of any one or more of Examples 34-35 optionally include wherein the operations further: generate two or more alternate routings based on a two-dimensional mapping of a space associated with the spatial data; transmit the two or more alternate routings to the sender; and obtain a selection of one of the two or more alternate routings from the sender, wherein the first signal operative to redirect the receiver includes the first signal operative to redirect the receiver along the one of the two or more alternate routings received from the sender.

In Example 37, the subject matter of any one or more of Examples 30-36 optionally include wherein obtain the model includes obtain a trained model.

In Example 38, the subject matter of any one or more of Examples 30-37 optionally include wherein the model includes a statistical model and determining the intent of the human include determining the intent of the human based on the statistical model.

Example 39 is a method for controlling a receiver, the method comprising: obtaining, at a computing device from a sender, environmental data associated with the receiver; obtaining, from a database, a first model defining a human intent; determining, by the computing device, an intent of the sender using the first model; and causing the computing device to transmit a first signal to the receiver, the first signal operative to cause the receiver to alter a first behavior based on the intent of the sender.

In Example 40, the subject matter of Example 39 optionally includes obtaining, at the computing device from the receiver, environmental data associated with the receiver; determining, by the computing device, an intent of a human located proximate the receiver based on a second model; and causing the computing device to transmit a second signal to the receiver, the second signal operative to cause the receiver to alter a second behavior based on the intent of the human.

In Example 41, the subject matter of any one or more of Examples 39-40 optionally include wherein obtaining the environmental data includes obtaining audio data via one or more audio devices associated with the sender, and the first signal operative to alter the first behavior includes the first signal operative to adjust a volume associate with at least one of the one or more audio devices associated with the sender.

In Example 42, the subject matter of any one or more of Examples 39-41 optionally include wherein obtaining the environmental data includes obtaining visual data via one or more video device associated with the sender, and the first signal operative to alter the first behavior includes the first signal operative to adjust a position of the receiver based on the intent of the sender.

In Example 43, the subject matter of any one or more of Examples 39-42 optionally include wherein obtaining the environmental data includes obtaining spatial data via at least one of an optical sensor and an acoustic sensor.

In Example 44, the subject matter of Example 43 optionally includes generating a three-dimensional mapping of a space based on the spatial data; and translating the three-dimensional mapping of the space to a two-dimensional mapping of the space; wherein the first signal is further operative to redirect the receiver within the space based on the two-dimensional mapping of the space and the intent of the sender.

In Example 45, the subject matter of any one or more of Examples 43-44 optionally include generating two or more alternate routings based on a two-dimensional mapping of a space associated with the spatial data; causing the computing device to transmit the two or more alternate routings to the sender; and obtaining a selection of one of the two or more alternate routings from the sender, wherein the first signal operative to redirect the receiver includes the first signal operative to redirect the receiver along the one of the two or more alternate routings received from the sender.

In Example 46, the subject matter of any one or more of Examples 39-45 optionally include wherein obtaining the model includes obtaining a trained model.

In Example 47, the subject matter of any one or more of Examples 39-46 optionally include wherein the model includes a statistical model and determining the intent of the human include determining the intent of the human based on the statistical model.

Example 48 is at least one computer-readable medium comprising instructions to perform any of the methods of Examples 39-47.

Example 49 is an apparatus comprising means for performing any of the methods of Examples 39-47.

Example 50 is at least one non-transitory computer-readable medium storing instructions that, when executed by at least one processor, cause the at least one processor to perform operations that: obtain, from a sender, environmental data associated with the receiver; obtain, from a database, a first model defining a human intent; determine, by the computing device, an intent of the sender using the first model; and cause the computing device to transmit a first signal to the receiver, the first signal operative to cause the receiver to alter a first behavior based on the intent of the sender.

In Example 51, the subject matter of Example 50 optionally includes wherein the operations further: obtain, at the computing device from the receiver, environmental data associated with the receiver; determine, by the computing device, an intent of a human located proximate the receiver based on a second model; and transmit a second signal to the receiver, the second signal operative to cause the receiver to alter a second behavior based on the intent of the human.

In Example 52, the subject matter of any one or more of Examples 50-51 optionally include wherein obtain the environmental data includes obtain audio data via one or more audio devices associated with the sender, and the first signal operative to alter the first behavior includes the first signal operative to adjust a volume associate with at least one of the one or more audio devices associated with the sender.

In Example 53, the subject matter of any one or more of Examples 50-52 optionally include wherein obtain the environmental data includes obtain visual data via one or more video device associated with the sender, and the first signal operative to alter the first behavior includes the first signal operative to adjust a position of the receiver based on the intent of the sender.

In Example 54, the subject matter of any one or more of Examples 50-53 optionally include wherein obtain the environmental data includes obtain spatial data via at least one of an optical sensor and an acoustic sensor.

In Example 55, the subject matter of Example 54 optionally includes generate a three-dimensional mapping of a space based on the spatial data; and translate the three-dimensional mapping of the space to a two-dimensional mapping of the space; wherein the first signal is further operative to redirect the receiver within the space based on the two-dimensional mapping of the space and the intent of the sender.

In Example 56, the subject matter of any one or more of Examples 54-55 optionally include generate two or more alternate routings based on a two-dimensional mapping of a space associated with the spatial data; transmit the two or more alternate routings to the sender; and obtain a selection of one of the two or more alternate routings from the sender, wherein the first signal operative to redirect the receiver includes the first signal operative to redirect the receiver along the one of the two or more alternate routings received from the sender.

In Example 57, the subject matter of any one or more of Examples 50-56 optionally include wherein obtain the model includes obtain a trained model.

In Example 58, the subject matter of any one or more of Examples 50-57 optionally include wherein the model includes a statistical model and determining the intent of the human include determining the intent of the human based on the statistical model.

Example 59 is a system for controlling a receiver, the method comprising: means for obtaining, at a computing device from the receiver, environmental data associated with the receiver; means for obtaining, from a database, a model defining a human intent; means for determining, by the computing device, an intent of a human proximate the receiver using the model; and means for causing the computing device to transmit a first signal to the receiver, the first signal operative to cause the receiver to alter a first behavior based on the intent of the human.

In Example 60, the subject matter of Example 59 optionally includes means for obtaining, at the computing device from a sender, environmental data associated with the sender; means for determining, by the computing device, an intent of the sender based on a model associated with the sender; and means for causing the computing device to transmit a second signal to the receiver, the second signal operative to cause the receiver to alter a second behavior based on the intent of the sender.

In Example 61, the subject matter of any one or more of Examples 59-60 optionally include wherein the means for obtaining the environmental data includes obtaining audio data via one or more audio devices attached to the receiver, and the first signal operative to alter the first behavior includes the first signal operative to adjust a volume associate with at least one of the one or more audio devices attached to the receiver.

In Example 62, the subject matter of any one or more of Examples 59-61 optionally include wherein the means for obtaining the environmental data includes obtaining visual data via one or more video device attached to the receiver, and the first signal operative to alter the first behavior includes the first signal operative to adjust a position of the receiver based on the intent of the human.

In Example 63, the subject matter of any one or more of Examples 59-62 optionally include wherein the means for obtaining the environmental data includes means for obtaining spatial data via at least one of an optical sensor and an acoustic sensor.

In Example 64, the subject matter of Example 63 optionally includes means for generating a three-dimensional mapping of a space based on the spatial data; and means for translating the three-dimensional mapping of the space to a two-dimensional mapping of the space; wherein the first signal is further operative to redirect the receiver within the space based on the two-dimensional mapping of the space.

In Example 65, the subject matter of any one or more of Examples 63-64 optionally include means for generating two or more alternate routings based on a two-dimensional mapping of a space associated with the spatial data; means for causing the computing device to transmit the two or more alternate routings to a sender; and means for obtaining a selection of one of the two or more alternate routings from the sender, wherein the first signal operative to redirect the receiver includes the first signal operative to redirect the receiver along the one of the two or more alternate routings received from the sender.

In Example 66, the subject matter of any one or more of Examples 59-65 optionally include wherein the means for obtaining the model includes means for obtaining a trained model.

In Example 67, the subject matter of any one or more of Examples 59-66 optionally include wherein the model includes a statistical model and the means for determining the intent of the human includes means for determining the intent of the human based on the statistical model.

Example 68 is a system for controlling a receiver, the method comprising: means for obtaining, at a computing device from a sender, environmental data associated with the receiver; means for obtaining, from a database, a first model defining a human intent; means for determining, by the computing device, an intent of the sender using the first model; and causing the computing device to transmit a first signal to the receiver, the first signal operative to cause the receiver to alter a first behavior based on the intent of the sender.

In Example 69, the subject matter of Example 68 optionally includes means for obtaining, at the computing device from the receiver, environmental data associated with the receiver; means for determining, by the computing device, an intent of a human located proximate the receiver based on a second model; and means for causing the computing device to transmit a second signal to the receiver, the second signal operative to cause the receiver to alter a second behavior based on the intent of the human.

In Example 70, the subject matter of any one or more of Examples 68-69 optionally include wherein the means for obtaining the environmental data includes obtaining audio data via one or more audio devices associated with the sender, and the first signal operative to alter the first behavior includes the first signal operative to adjust a volume associate with at least one of the one or more audio devices associated with the sender.

In Example 71, the subject matter of any one or more of Examples 68-70 optionally include wherein the means for obtaining the environmental data includes obtaining visual data via one or more video device associated with the sender, and the first signal operative to alter the first behavior includes the first signal operative to adjust a position of the receiver based on the intent of the sender.

In Example 72, the subject matter of any one or more of Examples 68-71 optionally include wherein obtaining the environmental data includes obtaining spatial data via at least one of an optical sensor and an acoustic sensor.

In Example 73, the subject matter of Example 72 optionally includes means for generating a three-dimensional mapping of a space based on the spatial data; and means for translating the three-dimensional mapping of the space to a two-dimensional mapping of the space; wherein the first signal is further operative to redirect the receiver within the space based on the two-dimensional mapping of the space and the intent of the sender.

In Example 74, the subject matter of any one or more of Examples 72-73 optionally include means for generating two or more alternate routings based on a two-dimensional mapping of a space associated with the spatial data; means for causing the computing device to transmit the two or more alternate routings to the sender; and means for obtaining a selection of one of the two or more alternate routings from the sender, wherein the first signal operative to redirect the receiver includes the first signal operative to redirect the receiver along the one of the two or more alternate routings received from the sender.

In Example 75, the subject matter of any one or more of Examples 68-74 optionally include wherein the means for obtaining the model includes obtaining a trained model.

In Example 76, the subject matter of any one or more of Examples 68-75 optionally include wherein the model includes a statistical model and the means for determining the intent of the human includes means for determining the intent of the human based on the statistical model.

In Example 77, the apparatuses, systems, computer-readable mediums, or method of any one or any combination of Examples 1-76 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for controlling a receiver, the system comprising:
at least one processor; and
at least one memory storing instructions that, when executed by the at least one processor, cause the at least one processor to perform operations that:
obtain, from the receiver, environmental data associated with the receiver, wherein the environmental data includes spatial data,
receive, from a database, a model defining a human intent,
determine an intent of a human associated with the receiver using the model,
generate two or more routings based on a two-dimensional mapping of a space associated with the spatial data,
transmit the two or more routings to the human,
receive a selection of one of the two or more routings from the human, and
transmit a first signal to the receiver, wherein the first signal is operative to cause the receiver to alter a first behavior based on the intent of the human, and wherein the first signal is operative to redirect the receiver along the one of the two or more routings received from the human.

2. The system of claim 1, wherein the operations further:
obtain, from the human, additional environmental data associated with the human;
determine the intent of the human based on the model associated with the human; and
transmit a second signal to the receiver, wherein the second signal is operative to cause the receiver to alter a second behavior based on the intent of the human.

3. The system of claim 1, wherein to obtain the environmental data includes to obtain audio data via one or more audio devices attached to the receiver, and
wherein the first signal operative to alter the first behavior includes the first signal operative to adjust a volume associated with at least one of the one or more audio devices attached to the receiver.

4. The system of claim 1, wherein to obtain the environmental data includes to obtain visual data via one or more video devices attached to the receiver, and
wherein the first signal operative to alter the first behavior includes the first signal operative to adjust a position of the receiver based on the intent of the human.

5. The system of claim 1, wherein the spatial data is obtained via at least one of an optical sensor and an acoustic sensor.

6. The system of claim 1, wherein the operations further:
generate a three-dimensional mapping of the space based on the spatial data; and
translate the three-dimensional mapping of the space to the two-dimensional mapping of the space;
wherein the first signal is further operative to redirect the receiver within the space based on the two-dimensional mapping of the space.

7. The system of claim 1, wherein to obtain the model includes to obtain a trained model.

8. The system of claim 1, wherein the model includes a statistical model and wherein to determine the intent of the human includes to determine the intent of the human based on the statistical model.

9. At least one non-transitory computer-readable medium storing instructions that, when executed by at least one processor of a computing device, cause the at least one processor to perform operations that:
obtain, from a receiver, environmental data associated with the receiver, wherein the environmental data includes spatial data;
obtain, from a database, a model defining a human intent;
determine, by the computing device, an intent of a human associated with the receiver using the model,
generate two or more routings based on a two-dimensional mapping of a space associated with the spatial data;
transmit the two or more routings to the human;
receive a selection of one of the two or more routings from the human; and
transmit, by the computing device, a first signal to the receiver, wherein the first signal is operative to cause the receiver to alter a first behavior based on the intent of the human, and wherein the first signal is operative to redirect the receiver along the one of the two or more routings received from the human.

10. The at least one non-transitory computer-readable medium of claim 9, wherein to obtain the environmental data includes to obtain visual data via one or more video devices attached to the receiver, and
wherein the first signal operative to alter the first behavior includes the first signal operative to adjust a position of the receiver based on the intent of the human.

11. The at least one non-transitory computer-readable medium of claim 9, wherein the spatial data is obtained via at least one of an optical sensor and an acoustic sensor.

12. The at least one non-transitory computer-readable medium of claim 9, wherein the operations further:
generate a three-dimensional mapping of the space based on the spatial data; and
translate the three-dimensional mapping of the space to the two-dimensional mapping of the space;
wherein the first signal is further operative to redirect the receiver within the space based on the two-dimensional mapping of the space.

13. A system for controlling a receiver by a human, the system comprising:
at least one processor; and
at least one memory storing instructions that, when executed by the processor, cause the at least one processor to perform operations that:
obtain, from the human, environmental data associated with the receiver, wherein the environmental data includes spatial data;
obtain, from a database, a model defining a human intent;
determine an intent of the human associated with the receiver using the model;
generate two or more routings based on a two-dimensional mapping of a space associated with the spatial data;
transmit the two or more routings to the human;
receive a selection of one of the two or more routings from the human; and
transmit a first signal to the receiver, wherein the first signal is operative to cause the receiver to alter a first behavior based on the intent of the human, and wherein the first signal is operative to redirect the receiver along the one of the two or more routings received from the human.

14. The system of claim 13, wherein the operations further:
   obtain, from the receiver, environmental data associated with the receiver;
   determine an intent of a human located proximate the receiver based on a second model; and
   transmit a second signal to the receiver, wherein the second signal is operative to cause the receiver to alter a second behavior based on the intent of the human.

15. The system of claim 13, wherein to obtain the environmental data includes to obtain audio data via one or more audio devices associated with the human, and
   wherein the first signal operative to alter the first behavior includes the first signal operative to adjust a volume associated with at least one of the one or more audio devices associated with the human.

16. The system of claim 13, wherein to obtain the environmental data includes to obtain visual data via one or more video devices associated with the human, and
   wherein the first signal operative to alter the first behavior includes the first signal operative to adjust a position of the receiver based on the intent of the human.

17. The system of claim 13, wherein the spatial data is obtained via at least one of an optical sensor and an acoustic sensor.

18. The system of claim 13, wherein the operations further:
   generate a three-dimensional mapping of the space based on the spatial data; and
   translate the three-dimensional mapping of the space to the two-dimensional mapping of the space;
   wherein the first signal is further operative to redirect the receiver within the space based on the two-dimensional mapping of the space and the intent of the human.

19. At least one non-transitory computer-readable medium storing instructions that, when executed by at least one processor of a computing device, cause the at least one processor to perform operations that:
   obtain, from a human, environmental data associated with a receiver, wherein the environmental data includes spatial data;
   obtain, from a database, a first model defining a human intent;
   determine, by the computing device, an intent of the human, associated with the receiver, using the first model;
   generate two or more routings based on a two-dimensional mapping of a space associated with the spatial data;
   transmit the two or more routings to the human;
   obtain a selection of one of the two or more routings from the human; and
   cause the computing device to transmit a first signal to the receiver, wherein the first signal is operative to cause the receiver to alter a first behavior based on the intent of the human, and wherein the first signal is operative to redirect the receiver along the one of the two or more routings received from the human.

20. The at least one non-transitory computer-readable medium of claim 19, wherein the operations further:
   obtain, at the computing device from the receiver, environmental data associated with the receiver;
   determine, by the computing device, an intent of a human located proximate the receiver based on a second model; and
   transmit a second signal to the receiver, the second signal operative to cause the receiver to alter a second behavior based on the intent of the human.

21. The at least one non-transitory computer-readable medium of claim 19, wherein to obtain the environmental data includes to obtain audio data via one or more audio devices associated with the human, and
   wherein the first signal operative to alter the first behavior includes the first signal operative to adjust a volume associated with at least one of the one or more audio devices associated with the human.

22. The at least one non-transitory computer-readable medium of claim 19, wherein the operations further:
   generate a three-dimensional mapping of the space based on the spatial data; and
   translate the three-dimensional mapping of the space to the two-dimensional mapping of the space;
   wherein the first signal is further operative to redirect the receiver within the space based on the two-dimensional mapping of the space and the intent of the human.

23. The at least one non-transitory computer-readable medium of claim 19, wherein the spatial data is obtained via at least one of an optical sensor and an acoustic sensor.

* * * * *